United States Patent [19]

Wilson

[11] Patent Number: 4,822,296
[45] Date of Patent: Apr. 18, 1989

[54] ELECTRICAL CONNECTION FOR BATTERY CHARGING APPARATUS OR THE LIKE

[75] Inventor: Anton Wilson, Shelton, Conn.
[73] Assignee: Anton/Bauer, Inc., Shelton, Conn.
[21] Appl. No.: 64,233
[22] Filed: Jun. 19, 1987
[51] Int. Cl.⁴ .......................................... H01R 13/639
[52] U.S. Cl. .................................................... 439/343
[58] Field of Search .............. 439/342, 343, 345, 350, 439/352, 246, 247, 248, 536, 553, 824, 825

[56] References Cited

U.S. PATENT DOCUMENTS

| | | | |
|---|---|---|---|
| 2,724,096 | 11/1955 | Klostermann | 439/824 |
| 3,713,076 | 1/1973 | Gabrielian et al. | 439/352 |
| 3,954,318 | 5/1976 | Larson et al. | 439/248 |
| 4,050,762 | 9/1977 | Hines et al. | 439/824 |
| 4,218,107 | 8/1980 | Wilson | 439/342 |
| 4,451,106 | 5/1984 | Wiseheart et al. | 439/536 |
| 4,550,968 | 11/1985 | Corrigan | 439/345 |

OTHER PUBLICATIONS

"Ucinite Miniature Banana Pins", Advertisement, Apr. 1954, Electronics, p. 46.

Primary Examiner—Joseph H. McGlynn
Attorney, Agent, or Firm—Kramer, Brufsky & Cifelli

[57] ABSTRACT

An electrical connection for a battery pack to a battery charger or the like consisting of a bracket including a substantially flat male plate having a plurality of spaced headed projections and female electrical terminals carried within a projecting housing and a substantially flat female plate having a plurality of keyholes designed to facilitate receiving the projections and pairs of fixed and movable male electrical terminals positioned within a recess for engagement with the female electrical terminals.

10 Claims, 3 Drawing Sheets

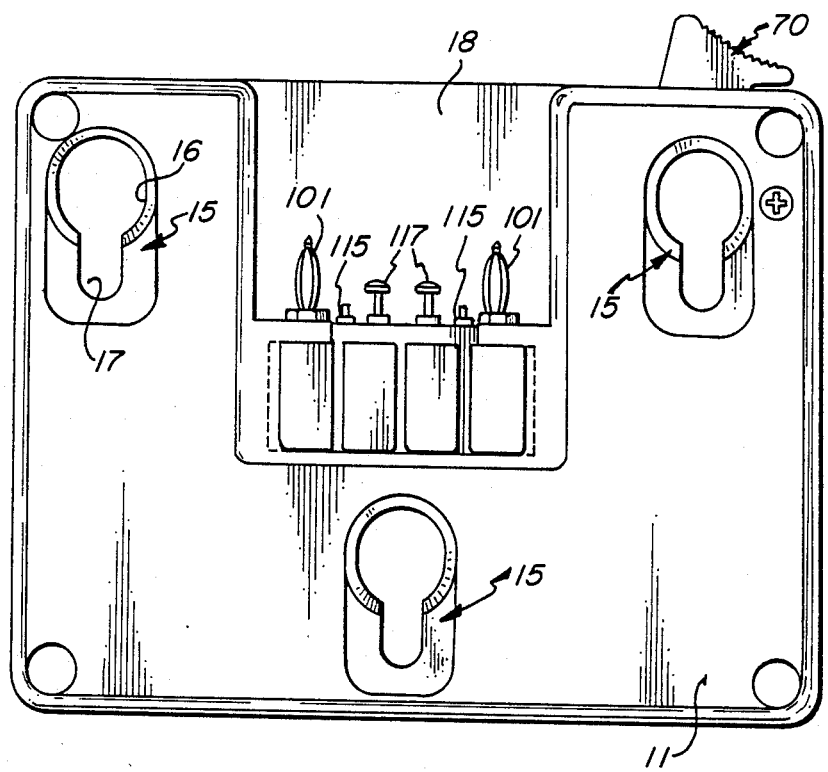
FIG. 2
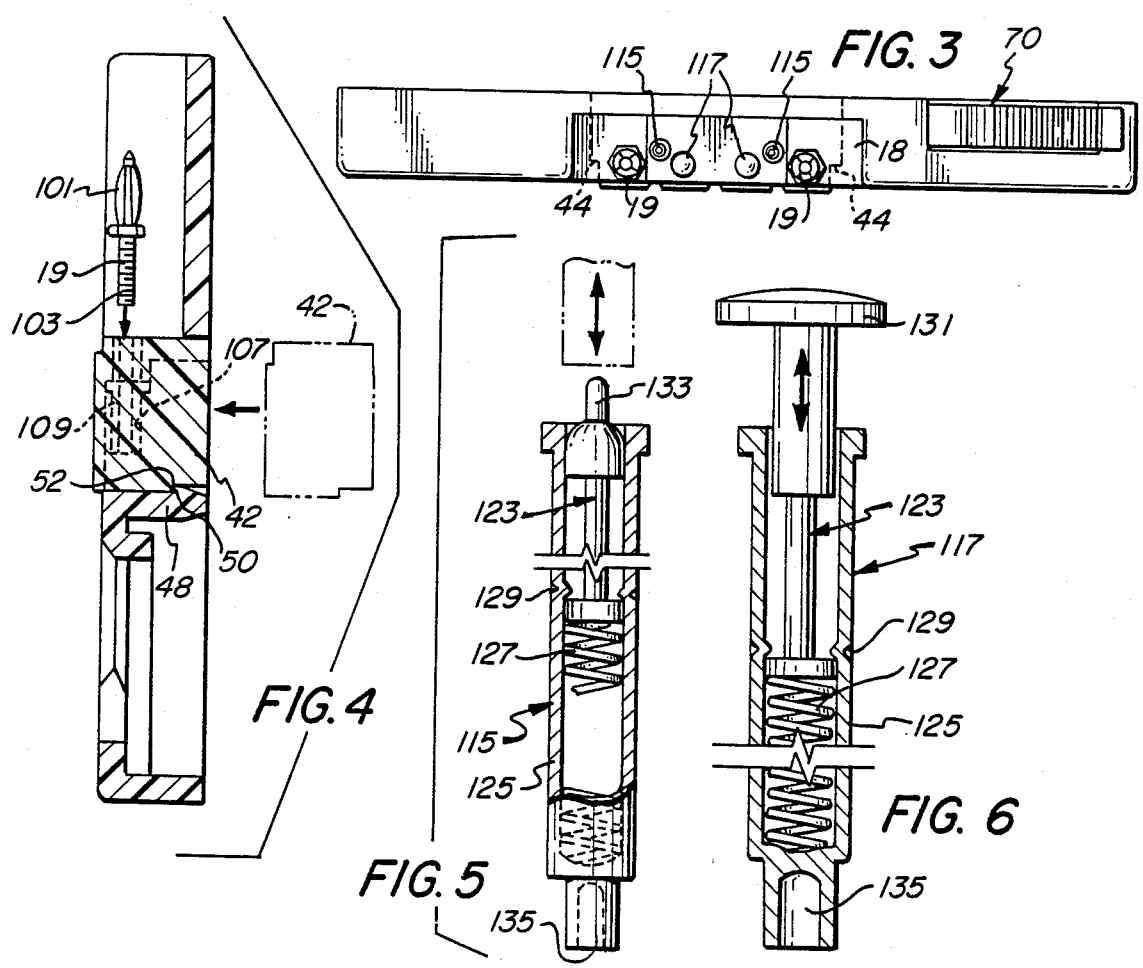
FIG. 3
FIG. 4
FIG. 5
FIG. 6

ELECTRICAL CONNECTION FOR BATTERY CHARGING APPARATUS OR THE LIKE

BACKGROUND OF THE INVENTION

1. Field of the Invention

This invention relates to an electrical connection, and more particularly, a multi-function electrical connection having a plurality of electrical contact pins mounted on a battery charger or the like.

2. Description of Prior Art

In U.S. Pat. No. 4,218,107, assigned to the same assignee as the present invention, a battery pack connection was disclosed which includes a female plate that is secured, for example, directly to a portable device such as a battery charger. The female plate is formed with a plurality of keyholes together with at least one male terminal with the keyholes and the terminal extending in the same direction but with the terminal being positioned within a recess spaced beneath the plane of the female plate. A male plate cooperates with the female plate and may form one side of a battery containing receptacle or pack. The male plate has a plurality of circular headed projections extending therefrom and at least one female terminal positioned within a housing that projects from the plane of the male plate.

In use, the female plate is fixed and connected to the electrical charger device and if the male plate is part of the battery pack, the user positions the male plate against the female plate with initial alignment occurring between the recess and the housing and with said alignment preventing lateral shifting of the plate with respect to the slots of the keyholes. The use can then only move the male plate in the direction of the keyhole slots until the headed projections enter into circular openings of the keyholes. The male plate is then further moved to position the projections within the slots of the keyholes with said movement causing electrical connection between the male and female terminals, so that the battery pack carried by the male plate may be recharged.

When the male plate has achieved its connected position, a tensioned flexible strip that is positioned behind one keyhole reverts to its normally biased position wherein it has a ledge which engages the head of the projection in said keyhole and prevents the two plates from moving from their connected position.

For removing the plate, the user merely bends the flexible strip from its normal position which unlocks the engagement between the strip and the projection to thereby permit the male plate to be moved so as to position the headed projections within the circular openings of the keyholes. At this position, the terminals have been disconnected and the male plate can be removed from the female plate.

In an improved battery pack connection disclosed in U.S. patent application, Ser. No. 068,350, filed July 1, 1987, entitled Battery Pack Connection, assigned to the same assignee as the present invention, the flexible locking strip is replaced by a positive, thumb-actuated pivoted locking mechanism having a locking pin adapted to be positioned over one of the threaded projections on the male plate after it is seated in the slot portion of a corresponding keyhole slot in the female plate. Upon pivoting of the mechanism with one hand, the pin can be removed from the path of movement of the head in the keyhole slot against the bias of a spring which provides a tactile feel upon opening and pivoting of the locking mechanism immediately conveying the position of the locking mechanism to the user that there is an unobstructed path of movement or clear keyhole slot. With the other hand, the entire male plate and headed projections can be moved up and out of corresponding closed keyhole slots, breaking the electrical connection between the terminal contacts on the male and female plates, and permitting the male plate and its batteries to be replaced by another pack or interchanged with another male plate containing a battery pack to be recharged, by reversing the procedure and repivoting and seating the locking pin over one of the headed projections. This is accomplished by simply releasing the locking mechanism, which is repositioned upon release by the return force of the leaf spring.

Additionally, instead of molding the female and male plates completely in one piece including support structure for the female and male contact terminals, respectively, on each plate, the terminals are provided on removable and adjustable terminal blocks for ease of assembly with wire connections exterior of the plates.

The female terminal block is adapted to be slid into the male plate with a U-shaped opening surrounding a stationary post. The upper and lower edges of the block are confined between upper and lower support shoulders forming a groove, which allows the connector block a specified amount of movement in all directions on a horizontal plane. This arrangement also permits preassembly of the contacts in the block and their attachment to wire connections with the battery associated with the male plate, exterior to the male plate, and once the block is slid into place on the male plate and the plate connected in turn to the female plate, the female contact terminals accepting the male contact terminals will self-align and make appropriate contact. This removes the necessity of precisely molding the contact placements in both the male and female plates.

Similarly, the male terminal block in the female plate can be separated from the female plate and slid onto the plate from the rear, riding over a cantilevered spring finger which snaps back positioning a shoulder behind the bottom edge of the block to hold it in place. Shoulders on the interior of the female plate limit inward sliding movement of the block. Male terminal contact pins can then be used to threadedly secure and lock the block against movement to the interior of the plate. As with the female connector block, the removability of the block allows assembly of electrical wiring from the device power is to be supplied to, exteriorly of the female plate. This invention relates to this electrical connection between the male and female terminal blocks, their pin mountings, the pin functions, and the manner in which the pins are activated.

SUMMARY OF THE INVENTION

In accordance with this invention, the electrical connection includes an electrical connector block provide on a female plate secured to an electrical device, such as a battery charger, although the female plate can be connected to a device, e.g., a camera or other portable device, which can be used to obtain and discharge power from a battery, rather than a device to charge a battery. A battery pack mounted on a male plate is releasably locked to the female plate and has electrical contacts in electrical communication with the battery pack to, for example, remove a charge from the battery charger to the battery pack or to establish a power connection to drive an electrical device. For purposes of discussions to follow, it will be assumed that the female plate is mounted on a battery charger, unless otherwise indicated, to recharge a battery pack carried on a male plate.

Upon locking the male plate to the female plate, the electrical contacts on the male plate are brought into electrical engagement with a plurality of contact pins on the electrical connector block mounted on the female plate. The outermost pins on the electrical connector block are expandable banana plugs providing a positive (+) and a negative (−) circuit connection to allow powering of a device by a battery/power supply or recharging of a battery carried by the male plate and are received in cylindrical tubular contact elements on the male plate. The remaining pins on the female connector block all comprise a piston adapted to move linearly within a cylinder against the bias of a coil spring. The piston head may be enlarged for contact with a correspondingly located tubular pin or terminal carried by the male plate or may have a reduced diameter portion to conserve space, which extends upwardly to effect the requisite contact with a solid contact pin.

Upon depression of the piston against the bias of the coil spring within its cylinder by one of the contact pins on the male plate, an electrical circuit can be established through the piston in sliding engagement with its cylinder. Each cylinder can be electrically connected to one or more charger circuits, which circuit can be used to energize a display, e.g., of a gauge to visually record the remaining voltage in the battery pack as it is charged or before recharging, if necessary. Another pin can be used to energize a circuit to enable a temperature responsive cut-off circuit in the charger to be activated so that the charger will not overheat when in use. Another one of the remaining contacts may, e.g., be used to establish an electrical circuit directly from the battery pack being recharged through its cylinder to sense whether the battery is resistor encoded or of a certain type compatible with the charger. The remaining pin can be used for a similar, albeit different communication between the battery pack and charger, e.g., to provide an analog output indicative of the remaining capacity in the battery, prior to recharging. The springs within each cylinder, upon depression, assure the maintenance of electrical contact between each piston and its corresponding contact pin on the male plate and allow depression of a contact on the female plate even in the absence of a corresponding pin on the male plate to establish a circuit at that location, so the female plate and its electrical connectors are compatible with a male plate provided with less circuits and function capability.

BRIEF DESCRIPTION OF THE DRAWINGS

Further objects and advantages of the invention will become apparent from the following description and claims, and from the accompanying drawings, wherein:

FIG. 2 is a front view in elevation of the female plate of the battery pack connector bracket of FIG. 1;

FIG. 3 is a top plan view of the female plate of FIG. 2;

FIG. 4 is a longitudinal cross-sectional view through the female plate of FIG. 2, illustrating in exploded detail one of the electrical connector pins employed in the electrical connector block mounted on the female plate;

FIG. 5 is a cross-sectional view of another one of the electrical connector pins employed in the electrical connector block mounted on the female plate;

FIG. 6 is a cross-sectional view of still another one of the electrical connector pins used in the electrical connector block mounted on the female plate;

DETAILED DESCRIPTION OF THE PREFERRED EMBODIMENT

Figure 1:
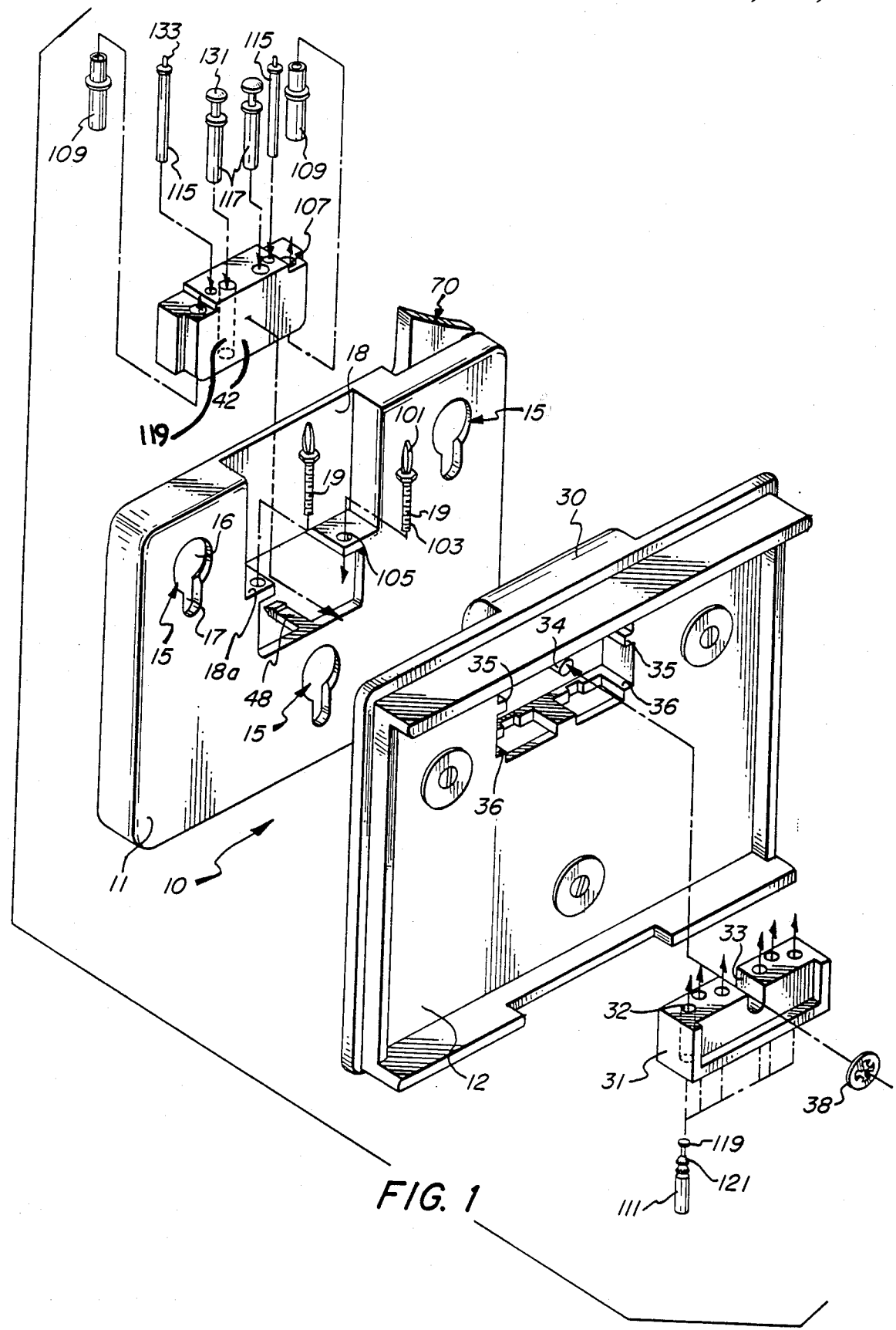
FIG. 1 is an exploded perspective view of a battery pack connector bracket adapted to be mounted on a battery charger including the electrical connection of the present invention.
Figure 7:
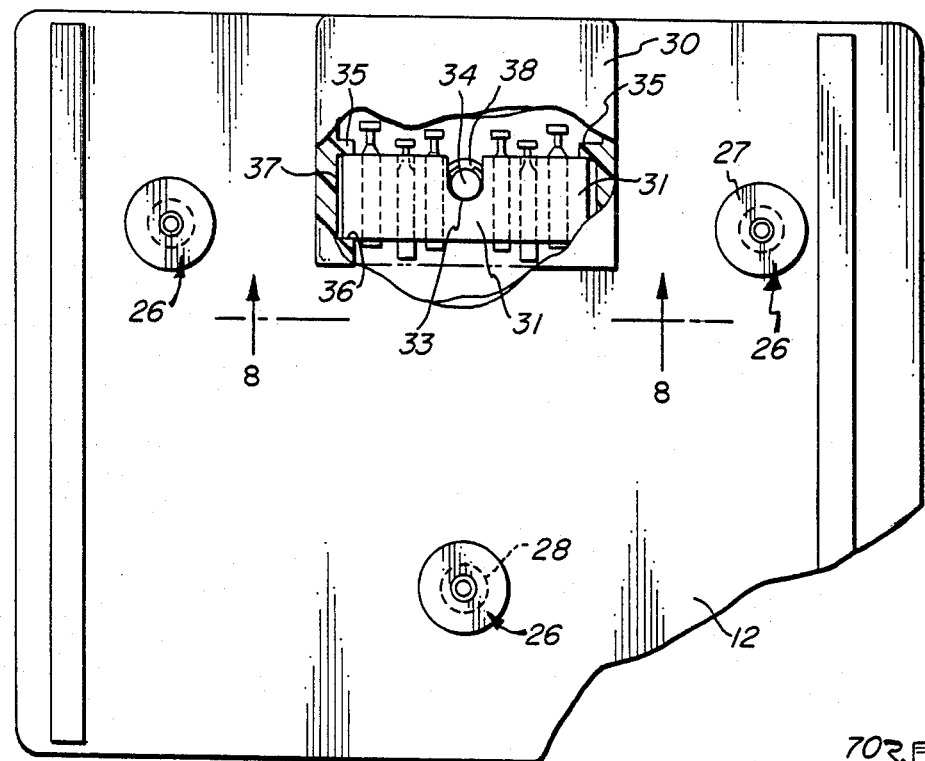
FIG. 7 is a front view in elevation of the male plate of the battery pack connector bracket of FIG. 1 with portions broken away for purposes of illustration.
Figure 8:
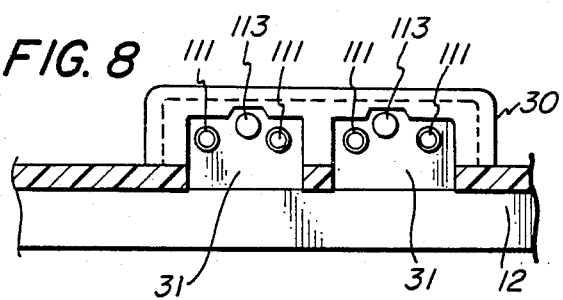
FIG. 8 is a cross-sectional view taken substantially along the plane illustrated by line 8—8 of FIG. 7.
Figure 9:
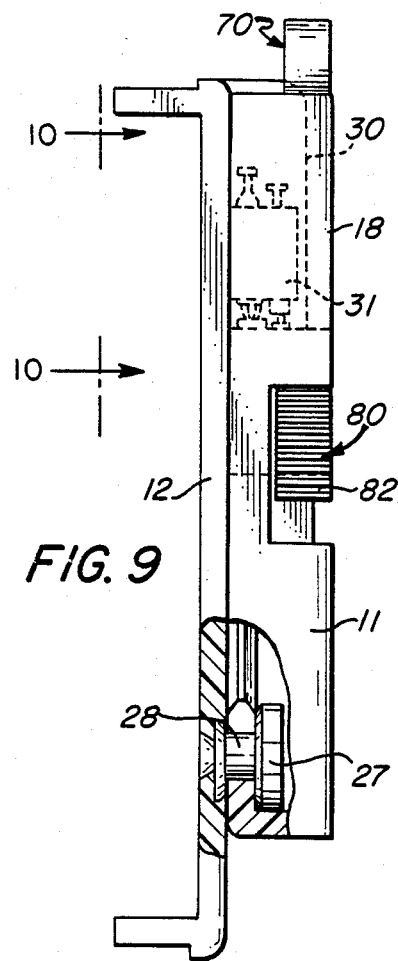
FIG. 9 is a side view in elevation of the connected male and female plates of the battery pack connector bracket with portions of the plates removed and portions shown in section for purposes of illustrating certain components thereof.

Referring now to the drawings in detail, wherein like numerals indicate like elements through the several views, a battery pack connector bracket is generally indicated by the reference numeral 10 in FIG. 1 and includes a female plate 11 and a male plate 12.

The bracket 10 and the plates 11,12 and their operation are described in detail in U.S. Application Ser. No. 31,104, filed Mar. 26, 1987, and now abandoned, and a continuation-in-part thereof, U.S. Application Ser. No. 068,350, filed July 1, 1987, both entitled Battery Pack Connection and assigned to the same assignee as the present invention. Such details are not part of the present invention, except for the electrical connections which may be used therein as described hereinafter, but the details of the battery pack connector brackets are incorporated herein by reference for understanding the background of the present invention. The plate 11 has a plurality of threaded apertures (not shown) on its backside corners by which it may be secured to an electrical device such as a battery recharging unit or the like (not shown) while the male plate 12 constitutes one side of a closed container which contains rechargable batteries. The container, if desired, may be secured to the male plate by fasteners extending into the peripheral edges of the plate.

The female plate 11 is formed with a plurality of keyholes 15 cut in its front surface, each having an elongated ovoid or elliptical opening 16 and a narrow depending slot 17. The keyholes 15 include two upper slots and a centrally located lower slot disposed in a substantially triangular array.

Formed between the two upper keyholes 15 is an open top recess 18 in which two male contact terminals 19 are secured. The terminals 19 are in the nature of banana plugs having expandable tips 101 and a threaded shank 103. As shown in FIGS. 1 and 4, they are positioned at the bottom wall 18a of the recess and secured thereto by passing through holes 105 in the bottom wall 18a of recess 18 formed therein into threaded engagement in tubular electrical contacts 109 provided in holes or slots 107 in an electrical contact connector block 42 slid into engagement (as shown in FIG. 4) with shoulders 44 (see FIG. 3) from the rear of the female plate 11. The threaded shank 103 of terminals 19 hold the connector block 42 to the bottom wall 18a of the recess 18. The threaded shank portions 103 of terminals 19 threadedly engage metal inserts 109 inserted into holes 107 from the bottom thereof which enable wires to be secured thereto on the rear side of the female plate 11 to effect electrical connection to the terminals. By positioning the terminals 19 within the recess, they accordingly are located beneath the face of the front of the female plate and hence less subject to abuse during the substitution of one battery pack for another or when exposed. By providing a separable connector block 42, the wires can be connected first to the respective inserts 109 of block 42 as a subassembly, which then can be electrically attached through the insert 109 to the threadedly received shank portions 103 of terminals 19, after block 42 is inserted into female plate 11. This provides for ease of assembly and precludes the wires from floating about where they may be subject to disconnection.

The electrical connector block 42 is slid onto the female plate 11 from the rear, riding over a cantilevered spring finger 48 which springs back up positioning a shoulder 50 behind the bottom edge 52 of the block 42 to hold it in place.

The male plate 12 is formed with a plurality of projections 26, each of which has a large circular head 27 and an integral narrow leg portion 28.

Figure 10:
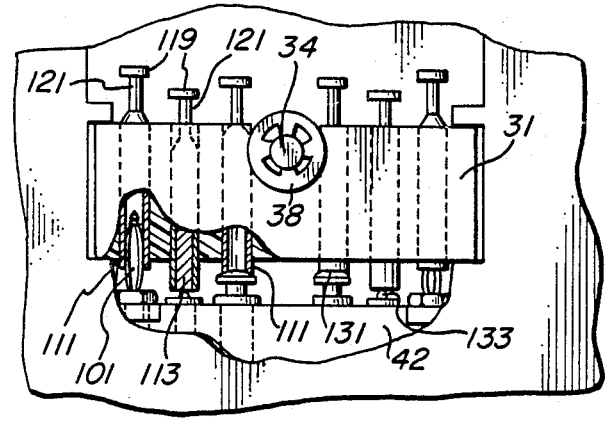
FIG. 10 is a view as seen along the plane indicated by line 10—10 of FIG. 9, with portions removed and in section for purposes of illustration.

Extending beyond the face of the male plate is an integral housing 30 having the generally rectangular shape shown. An electrical contact terminal block 31 is provided in housing 30 with a plurality of holes 32 for receiving hollow electrical contact terminals 111 and solid terminals 113 (see FIG. 10), as described in more detail hereinafter, at corresponding locations to the terminal contacts 19 on block 42 along with other types of terminals 115, 117 (as shown in detail in FIGS. 5 and 6 and discussed more fully hereinafter).

The terminal block 31 is adapted to be slid into the male plate 12 from the rear of housing 30 (see FIG. 1) with a U-shaped opening 33 surrounding a stationary post 34 molded integral with housing 30. The upper and lower edges of the block 31 are confined between upper and lower support shoulders 35,36 respectively, forming a groove. This arrangement permits preassembly of the contacts 111, 113 in the block 31 and their attachment to wire connections with the battery pack associated with the male plate 12 exterior to the male plate 12, and once the block 31 is slid into place on the male plate 12 and the plate connected in turn to the female plate, the male terminals 19 will be received in the hollow female contact terminals 111 in holes 32 and will self-align along with the other corresponding contact pin pairs 113,115 and 111,117 (see FIG. 10) and make appropriate contact as the connector block 31 in the male plate 12 has restricted lateral movement about the stationary post 34 in a perpendicular direction between the support shoulders 35,36 as a small space 37 is provided between the side walls of the housing and the lateral edges of block 31. Slight back and forth movement is also contemplated, as a lock washer 38 received over post 34 on the rear of post 34 to prevent removal of block 31 from housing 30 is spaced rearwardly from an undercut edge of the block. This resultant movement in a horizontal plane removes the necessity of precisely molding the contact placements in both the male and female plates as the connection will be substantially self-aligning.

A positive, thumb-actuated pivoted locking mechanism generally designated by the numeral 70 is adapted to be positioned over one of the headed projections 27 on the male plate 12 after it is seated in the slot portion 17 of a corresponding keyhole slot 15 in the female plate 11 to lock the male and female plates together after a new battery has been substituted with a male plate. The locking mechanism 70 is described in detail in U.S. Application Ser. No. 31,104, filed Mar. 26, 1987 and forms no part of the present invention. Additionally, the locking mechanism can incorporate a safety latch 80 precluding inadvertent and accidental pivoting of the locking mechanisms to an open position once the headed projection 27 is seated in the bottom of a keyhole slot 15. The latch 80 includes a knurled thumb-actuated slide 82 on the side wall of the female plate 11 which can be pushed up and down as also described in U.S. Application Ser. No. 31,104 to preclude accidental movement of locking mechanism 70 to an open position.

Electrical connector block 42 is provided on a female plate 11 secured to an electrical device, such as a battery charger. A battery pack mounted on a male plate 12 is releasably locked to the female plate 11 and has electrical contacts in electrical communication with the battery pack to remove a charge from the battery charger to the battery pack. Upon locking the male plate 12 to the female plate 11, the contacts 111,113 on the male plate 12 are brought into electrical and mechanical engagement with contact pins 19, 115 and 117 on the electrical connector block 42 mounted in holes or slots 119 on the female plate 11. The outermost pins 19 with enlargeable heads 101 on the electrical connector block 42 are expandable banana plugs providing a positive (+) and a negative (−) circuit connection to a source of power through the battery charger to recharge the batteries carried by the male plate and are received in conductive cylindrical tubular contact elements 111 in block 31. These hollow contact elements 111 have an enlarged head 119 and upright post 121 about which a wire lead to the battery pack being recharged can be attached.

The remaining pins 115,117 on the female connector block 42 each include a piston 123 adapted to move linearly within an electrically conductable cylinder 125 against the bias of a coil spring 127. Each cylinder 125 has an annular, inwardly extending crimp 129 for abutment with the piston 123 to limit the extent of its upward movement in its cylinder 125 under urging of spring 127. The piston head 131 of contact pin 117 may be enlarged or mushroom-shaped for contact with a correspondingly located pin 111 carried by the male plate block 31, or a pin 115 may have a reduced diameter portion 133 to conserve space between pins extending upwardly from its piston 123 to effect electrical contact with correspondingly located solid pin 113.

Upon contact and depression of the piston head 131 by tubular pin 111 against the bias of the coil spring 127 within the cylinder 125, an electrical circuit through the cylinder is established from pin 111, head 131 and piston 123 in contact with the cylinder wall. Suitable wire leads may be attached within a cup 135 provided on the bottom of cylinder 125 of pin 117, to tap the connection. Such a circuit can be used to energize a display, e.g., of a gauge to visually record the remaining voltage in the battery pack as it is charged or before recharging, if necessary. Another pin 117 of the enlarged headed piston type can be used to energize temperature responsive cut-off circuit in the charger so that the battery will not overheat when on charge.

The reduced diameter piston head portion 133 of the remaining contacts 115 may, e.g., be used to establish an electrical circuit directly from the battery pack being recharged through solid pin 113 to its cylinder 125 from piston 123 to sense whether the battery is resistor encoded or of a certain type compatible with the charger. A cup 135 is also provided on the bottom of cylinder 125 of contact pin 115 to receive a wire lead which can be soldered to the cylinder 125. The remaining like pin 115 can be used for a similar, albeit different communication between the battery pack and charger or any like device.

The springs 127 within each cylinder 125 allow depression of a contact 115,117 on the female plate 11 even in the absence of a corresponding pin 111 or 113 on the male plate 12 to establish a circuit at that location, so the female plate and its electrical connectors are compatible with a male plate provided with less circuits and function capability.

What is claimed is:

1. An electrical connection comprising
a relatively flat male plate, and
a relatively flat female plate,
said plates being adapted to be releasably locked together in connected condition,
said female plate including
an open top recess being adapted to contain a plurality of elongated electrical terminals,
a connector block being adapted to be releasably received in and locked to said open top recess, said connector block containing
a plurality of depending slots formed therein, and
a plurality of elongated electrical terminals being elongated in the same direction as said slots;
said male plate including
a housing having an opening extending outwardly from said male plate, said housing being adapted to contain a plurality of elongated mating electrical terminals,
a terminal block being adapted to be releasably received in and locked to said opening in the male plate,
a plurality of spaced headed projections with there being one for each slot and with each projection having head and leg portions, and
elongated mating electrical terminals, at least some of which correspond in location to the electrical terminals on said connector block when said plates are releasably locked together, and
said male plate being positioned abutting the female plate with a leg of each of the projections being located in an associated slot and with the elongated electrical terminals on said connector block in contact with the mating electrical terminals on said terminal block, and
said elongated electrical terminals on said connector block including:
(1) a pair of terminals having a fixed head in the direction of said depending slots located in individual recesses in said connector block, and
(2) at least one terminal having a movable head in the direction of said depending slots to allow depression even in the absence of a corresponding terminal on the male plate; and
the corresponding mating electrical terminals on said terminal block either receiving the fixed heads on said terminals on said connector block or being in contact with said movable head on the other terminal on said connector block to depress the same in the direction of said slots when said plates are locked together, to establish an electrical connection.

2. The connection of claim 1 wherein each of said pair of terminals on said connector block have a fixed head in the direction of said slots which is expandable laterally.

3. The connection of claim 1 including:
releasable locking means on said female plate for engaging at least one of the headed projections in at least one of said slots to lock said plates in connected position by preventing relative movement between said plates in the direction of said slots by maintaining the engagement of said locking means with said headed projection until said locking means is released.

4. The connection of claim 1 wherein the terminal on said female plate having a movable head in the direction of said slots includes:
an electrically conductive cylinder,
an electrically conductive movable piston in said cylinder in contact with the wall thereof,
means on said cylinder for limiting the travel of said piston,
spring means in said cylinder between the bottom of said piston and the bottom of said cylinder for urging said piston towards said limit means, and
a cup on the bottom of said cylinder for receiving an electrical connector.

5. The connection of claim 4 wherein said piston includes an enlarged mushroom-shaped head.

6. The connection of claim 4 wherein said piston includes a reduced diameter head, smaller in diameter than said cylinder.

7. An electrical connection comprising
a relatively flat male plate, and
a relatively flat female plate,
said plates being adapted to be releasably locked together in connected condition,
said female plate including
a plurality of depending slots,
means for establishing a first electrical circuit comprising first and second electrical terminals being elongated in the same direction as said slots, and
means for establishing at least a second electrical circuit comprising at least a third electrical terminal elongated in the same direction as said slots,
said male plate including
a plurality of spaced projections with there being one for each slot, and
means for establishing said first electrical circuit comprising first and second elongated mating electrical terminals which correspond in location to the first and second electrical terminals on said female plate when said plates are releasably locked together, and
means for establishing at least said second electrical circuit comprising at least a third mating electrical terminal which corresponds in location to the third electrical terminal on said female plate when said plates are releasably locked together,
said male plate being positioned abutting the female plate with each of the projections being located in an associated slot and with the elongated electrical terminals on said female plate in contact with the mating electrical terminals on said male plate, and
said first and second elongated electrical terminals on said female plate including: a pair of terminals having a fixed head in the direction of said depending slots located in individual recesses in said female plate, and said third elongated electrical terminal on said female plate including at least one terminal having a movable head in the direction of said depending slots to allow depression even in the absence of a corresponding terminal on the male plate; and the corresponding first and second mating electrical terminals on said male plate receiving the first and second fixed heads on said terminals on said female plate to establish said first electrical circuit, and said at least a third mating electrical terminal being in contact with said moving head on the third terminal on said female plate to depress the same in the direction of said slots when said plates are locked together, to establish said second electrical circuit.

8. The electrical connection of claim 7 wherein said female plate has six terminals extending in the direction of said depending slots.

9. The electrical connection of claim 7 wherein said female plate further includes
   an open top recess being adapted to contain a plurality of elongated electrical terminals, and
   a connector block being adapted to be releasably received in and locked to said open top recess, said connector block having said plurality of depending slots formed therein.

10. The electrical connection of claim 9 wherein said male plate further includes
    a housing having an opening extending outwardly from said male plate, said housing being adapted to contain a plurality of elongated mating electrical terminals, and
    a terminal block being adapted to be releasably received in and locked to said opening in the male plate.

* * * * *